United States Patent
Lee

(10) Patent No.: US 11,144,460 B2
(45) Date of Patent: Oct. 12, 2021

(54) DATA STORAGE DEVICE, DATA PROCESSING SYSTEM, AND OPERATING METHOD OF DATA STORAGE DEVICE

(71) Applicant: SK hynix Inc., Gyeonggi-do (KR)

(72) Inventor: Seok Jun Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/797,773

(22) Filed: Feb. 21, 2020

(65) Prior Publication Data

US 2021/0034532 A1    Feb. 4, 2021

(30) Foreign Application Priority Data

Jul. 30, 2019    (KR) .................. 10-2019-0092255

(51) Int. Cl.
| G06F 12/08 | (2016.01) |
| G06F 12/0864 | (2016.01) |
| G06F 12/0873 | (2016.01) |
| G06F 9/54 | (2006.01) |
| G06F 13/16 | (2006.01) |
| G06F 12/02 | (2006.01) |

(52) U.S. Cl.
CPC .......... G06F 12/0864 (2013.01); G06F 9/546 (2013.01); G06F 12/0246 (2013.01); G06F 12/0873 (2013.01); G06F 13/1668 (2013.01); G06F 2212/7201 (2013.01)

(58) Field of Classification Search
None
See application file for complete search history.

(56) References Cited

U.S. PATENT DOCUMENTS

| 5,740,465 | A | 4/1998 | Matsunami et al. |
| 6,553,511 | B1 | 4/2003 | DeKoning et al. |
| 6,996,676 | B2 | 2/2006 | Megiddo et al. |
| 7,549,034 | B2 | 6/2009 | Foster, Sr. et al. |
| 7,613,877 | B2 | 11/2009 | Shimozono et al. |
| 7,856,530 | B1 | 12/2010 | Mu |
| 8,972,957 | B2 | 3/2015 | Bates et al. |
| 9,003,126 | B2 | 4/2015 | Cai et al. |
| 9,104,599 | B2 | 8/2015 | Atkisson et al. |
| 9,329,846 | B1 | 5/2016 | August et al. |
| 9,378,135 | B2 | 6/2016 | Bennett |
| 9,400,749 | B1 | 7/2016 | Kuzmin et al. |
| 9,703,664 | B1 | 7/2017 | Alshawabkeh et al. |

(Continued)

FOREIGN PATENT DOCUMENTS

| KR | 10-2017-0006427 | 1/2017 |
| KR | 10-2017-0081126 | 7/2017 |

OTHER PUBLICATIONS

Differences between disk cache write-through and write-back, Jun. 6, 2016, <https://forum.huawei.com/enterprise/en/differences-between-disk-cache-write-through-and-write-back/thread/203781-891 >.

(Continued)

*Primary Examiner* — Kevin Verbrugge
(74) *Attorney, Agent, or Firm* — IP & T Group LLP

(57) ABSTRACT

A data storage device may include a controller configured to generate an ID based on a name and a version of an application transmitted from a host device together with a logic address, and generate an L2P map list for each application based on the ID; and a nonvolatile memory apparatus including a plurality of map blocks configured to store map data for each ID.

20 Claims, 12 Drawing Sheets

(56) References Cited

U.S. PATENT DOCUMENTS

| | | |
|---|---|---|
| 2003/0041212 A1 | 2/2003 | Creta et al. |
| 2007/0118695 A1 | 5/2007 | Lowe et al. |
| 2007/0220201 A1 | 9/2007 | Gill et al. |
| 2009/0125548 A1 | 5/2009 | Moir et al. |
| 2011/0093648 A1 | 4/2011 | Belluomini et al. |
| 2012/0096225 A1 | 4/2012 | Khawand et al. |
| 2012/0124294 A1 | 5/2012 | Atkisson et al. |
| 2013/0124794 A1 | 5/2013 | Bux et al. |
| 2013/0151777 A1 | 6/2013 | Daly et al. |
| 2013/0151778 A1 | 6/2013 | Daly et al. |
| 2013/0151780 A1 | 6/2013 | Daly et al. |
| 2014/0047170 A1 | 2/2014 | Cohen et al. |
| 2014/0173234 A1 | 6/2014 | Jung et al. |
| 2015/0301744 A1 | 10/2015 | Kim et al. |
| 2015/0378925 A1 | 12/2015 | Misra |
| 2016/0147654 A1 | 5/2016 | Zhao et al. |
| 2016/0267018 A1 | 9/2016 | Shimizu et al. |
| 2016/0274797 A1 | 9/2016 | Hahn |
| 2016/0299715 A1 | 10/2016 | Hashimoto et al. |
| 2017/0060202 A1 | 3/2017 | Sundaram et al. |
| 2017/0109089 A1 | 4/2017 | Huang |
| 2017/0192902 A1 | 7/2017 | Hwang et al. |
| 2017/0351452 A1 | 12/2017 | Boyd et al. |
| 2018/0067678 A1 | 3/2018 | Jeong et al. |
| 2018/0101477 A1 | 4/2018 | Kan et al. |
| 2019/0004591 A1 | 1/2019 | Park et al. |
| 2019/0004944 A1 | 1/2019 | Widder et al. |
| 2019/0042464 A1 | 2/2019 | Genshaft et al. |
| 2019/0265976 A1 | 8/2019 | Goryayskiy et al. |
| 2019/0272104 A1 | 9/2019 | Durnov et al. |
| 2019/0294546 A1 | 9/2019 | Agarwal et al. |
| 2020/0278797 A1 | 9/2020 | Bavishi |
| 2020/0327063 A1 | 10/2020 | Kang et al. |
| 2020/0334138 A1 | 10/2020 | Byun |
| 2020/0334166 A1 | 10/2020 | Byun et al. |

OTHER PUBLICATIONS

Cai Y et al., Error Characterization, Mitigation, and Recovery in Flash Memory Based Solid-State Drives, Aug. 18, 2017, IEEE.

Office Action issued by the USPTO for U.S. Appl. No. 16/842,416 dated May 3, 2021.

Notice of Allowance issued by the USPTO for U.S. Appl. No. 16/717,144 dated Jun. 10, 2021.

Office Action issued by the USPTO for U.S. Appl. No. 16/837,764 dated Aug. 18, 2021.

DATA STORAGE DEVICE, DATA PROCESSING SYSTEM, AND OPERATING METHOD OF DATA STORAGE DEVICE

CROSS-REFERENCES TO RELATED APPLICATION

The present application claims priority under 35 U.S.C. § 119(a) to Korean application number 10-2019-0092255, filed on Jul. 30, 2019, which is incorporated herein by reference in its entirety.

BACKGROUND

1. Technical Field

Various embodiments generally relate to a semiconductor apparatus, and more particularly, to a data storage device, a data processing system, and an operating method of the data storage device.

2. Related Art

Recently, a paradigm for a computer environment has been changed to ubiquitous computing which enables a computer system to be used anytime and anywhere. Therefore, the use of portable electronic devices such as cellular phones, digital cameras, and notebook computers is rapidly increasing. Such portable electronic devices generally use a data storage device using a memory apparatus. The data storage device is used to store data used in the portable electronic devices.

The data storage device using the memory apparatus is advantageous in that stability and durability are superior due to the absence of a mechanical driving unit, an information access speed is very fast, and power consumption is small. The data storage device having such advantages includes a universal serial bus (USB) memory apparatus, a memory card having various interfaces, a universal flash storage (UFS) device, and a solid state drive.

Furthermore, by improving the read performance of the data storage device, user response time speed is improved.

SUMMARY

A data storage device for improving read performance, a data processing system, and an operating method of the data storage device are described herein.

In an embodiment, a data processing system includes: a host device configured to transmit a name and a version of an application to a data storage device together with a logical address; and the data storage device configured to generate an identification (ID) based on the name and version of the application transmitted from the host device, generate a logical address to physical address (L2P) map list for each application based on the ID, and store the L2P map list in a corresponding map block.

In an embodiment, a data storage device includes a controller configured to generate an ID based on a name and a version of an application transmitted from a host device together with a logic address, and generate an L2P map list for each application based on the ID; and a nonvolatile memory apparatus including a plurality of map blocks configured to store map data for each ID.

In an embodiment, an operating method of a data storage device includes: generating an ID based on application information transmitted from a host device; generating an L2P map list for each application based on the ID; and storing map data for each ID.

In an embodiment, a host device includes: a processor configured to transmit a name and a version of an application to a data storage device together with a logical address; and a host memory configured to store map data for the application which is provided from the data storage device, wherein, when an application running in a foreground is changed, the processor transmits the stored map data to the data storage device along with a read command when map data corresponding to a logic address to access is stored in the host memory.

In accordance with the embodiments, a host-aware performance boost (HPB) recognizes in advance information on a foreground application directly connected to QoS of a user, so that it is possible to improve the performance of a read operation.

DETAILED DESCRIPTION

Figure 1:
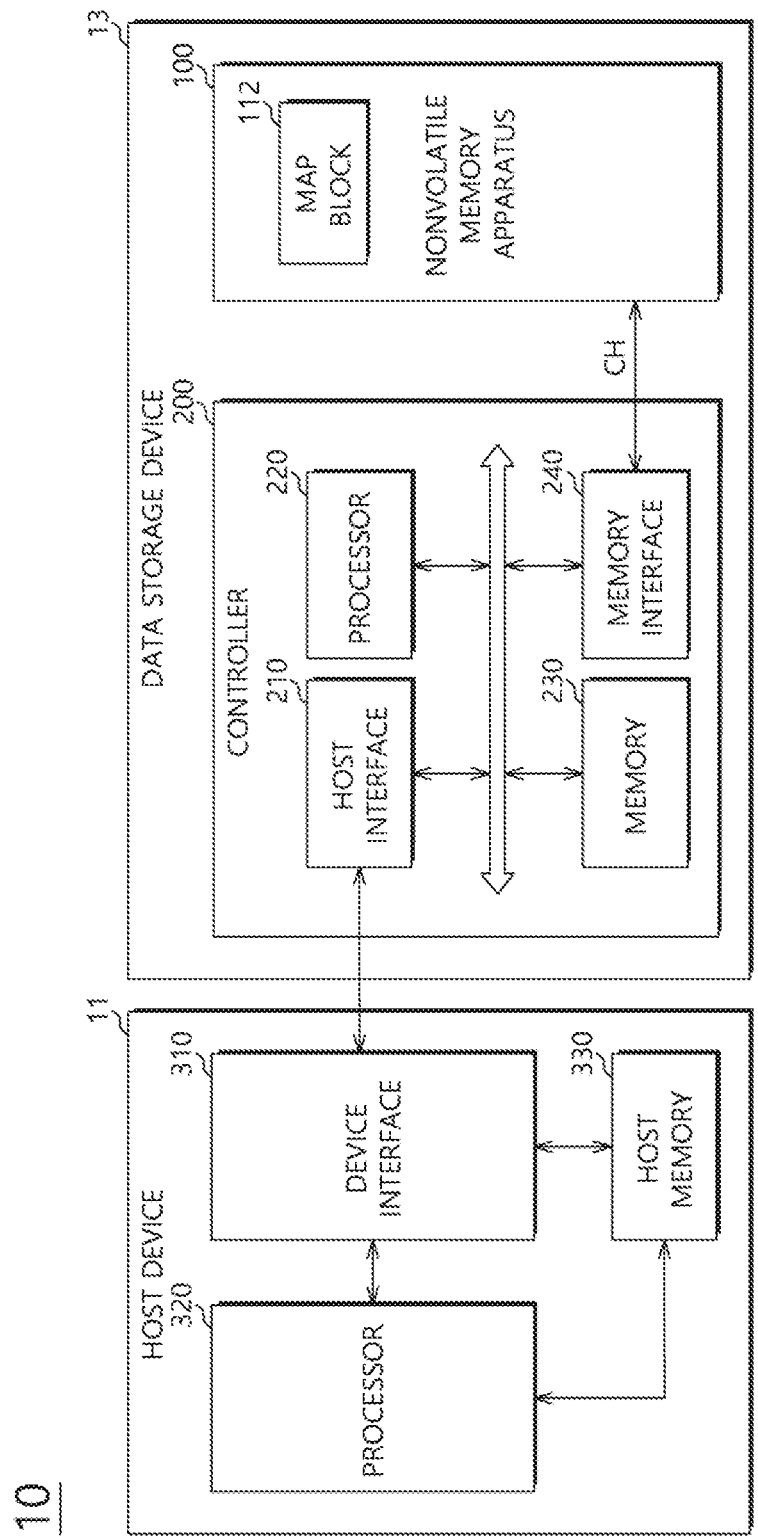
FIG. 1 is a diagram illustrating a data processing system in accordance with an embodiment.

Hereinafter, preferred embodiments will be described with reference to the accompanying drawings. These embodiments are provided so that this disclosure is thorough and complete, and fully conveys the scope of the present invention to those skilled in the art. Throughout the disclosure, like reference numerals refer to like parts throughout the various figures and embodiments of the present invention.

It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

As used herein, singular forms may include the plural forms as well and vice versa, unless the context clearly indicates otherwise. The articles 'a' and 'an' as used in this application and the appended claims should generally be construed to mean 'one or more' unless specified otherwise or it is clear from context to be directed to a singular form.

FIG. 1 is a diagram illustrating a data processing system 10 in accordance with an embodiment.

Referring to FIG. 1, the data processing system 10 may include a host device 11 and a data storage device 13.

A host-aware performance boost (HPB) adopted in UFS 3.0 is a method of caching a part of flash map data of the data storage device 13 in a host memory 330 included in the host device 11, which is relatively larger in memory resources compared to a flash memory, and transmitting the cached map data to the data storage device 13 along with a read command, thereby improving random read performance. The host memory 330 may be a dynamic random access memory (DRAM).

The HPB is for minimizing map load overhead due to the insufficient memory resources of the data storage device 13 by caching map data of frequently used logical block addresses (LBAs) in the host memory 330.

An address for data according to a file system used by the host device 11 may be referred to as a logical address (or a logical block address), and an address for data in a storage space including nonvolatile memory cells may be referred to as a physical address (or a physical block address).

In accordance with the present embodiment, the host device 11 may determine a logical address used by a foreground application as a hot region to receive corresponding map data in advance. The foreground application may denote an application currently running in the foreground.

Specifically, the host device 11 may include a device interface 310, a processor 320, and the host memory 330.

The device interface 310 may serve as an interface between the host device 11 and the data storage device 13 according to a protocol of the data storage device 13.

The processor 320 may determine a logical address, at which map data is provided from the data storage device 13, as a logical address currently used by the foreground application. This is because the host device 11 determines that an application running in the foreground performs a relatively large number of inputs/outputs (I/O).

The processor 320 may transmit a name and a version of the application to the data storage device 13 together with the logical address.

Specifically, when transmitting a read command to the data storage device 13, the processor 320 may transmit the name and version of the application and the logical address to the data storage device 13.

The processor 320 may transmit a logical address and application information, such as the name, version of the application and the like, corresponding to the logical address to the data storage device 13, thereby forming a logical address area for each application.

Accordingly, the data storage device 13 may form and manage the logical address received from the host device 11 and the application information corresponding to the logical address as a separate logical address area for each application, which will be described in detail below.

Whenever the foreground application is changed, the processor 320 may transmit the name and version of the foreground application to the data storage device 13.

Moreover, the processor 320 may store map data, which belongs to the foreground application and received from the data storage device 13, in the host memory 330 and separately manage the map data.

Figure 7:
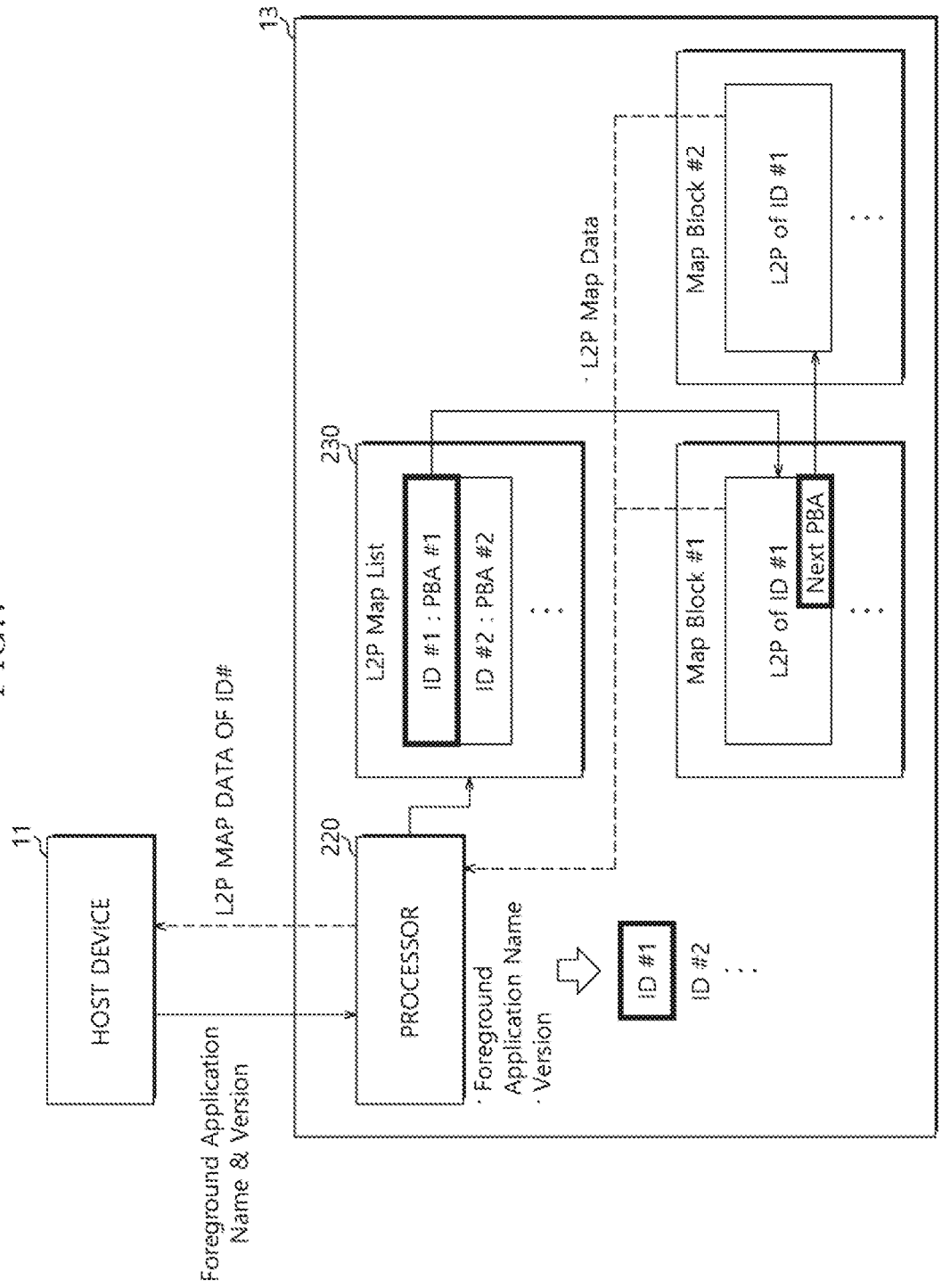

As illustrated in FIG. 7, the processor 320 may receive map data (i.e., L2P map data for each ID) corresponding to the name and version of the foreground application from the data storage device 13.

Then, when transmitting a read command, the processor 320 may transmit the map data along with the read command to the data storage device 13.

The host memory 330 may store the map data for the foreground application.

The data storage device 13 may generate identifications (IDs) by applying a hash function to the name and version of the application, generate an L2P (logical address to physical address) map list for each application based on the IDs, and store the L2P map list in a corresponding map block 112.

The data storage device 13 may transmit the map data for the foreground application to the host device 11.

Specifically, the data storage device 13 may include a nonvolatile memory apparatus 100 and a controller 200.

The controller 200 may generate IDs by applying a hash to the name and the version of an application transmitted from the host device 11, and generate the application-level L2P map list based on the IDs.

Furthermore, when the name and the version of the foreground application are transmitted from the host device 11, the controller 200 may search for and return corresponding map data based on the IDs.

The controller 200 may include a host interface 210, a processor 220, a memory 230, and a memory interface 240.

The host interface 210 may interface the data storage device 13 with the host device 11 according to the protocol of the host device 11. For example, the host interface 210 may communicate with the host device through any one of universal serial bus (USB), universal flash storage (UFS), multi-media card (MMC), parallel advanced technology attachment (PATA), serial advanced technology attachment (SATA), small computer system interface (SCSI), serial attached SCSI (SAS), peripheral component interconnection (PCI), and PCI express (PCI-E) protocols.

The processor 220 may be electrically connected to the host device 11, and control the operation of the data storage device 13.

The processor 220 may generate IDs by applying a hash function to the name and version of the application, and manage the IDs. The processor 220 may search for an ID that matches the name and version of the foreground application, and transmit the ID to the host device 11.

The memory 230 may store an L2P map list for each application, which matches the ID.

The memory interface 240 may control the nonvolatile memory apparatus 100 under the control of the processor 220.

The map block 112 may store map data for each ID. The map block 112 may be provided in a plural number. As illustrated in FIG. 1, the map block 112 may be included in the nonvolatile memory apparatus 100.

When the map data for each ID is stored across two or more map blocks, the map data for each ID may include a physical address link of a next map block.

The map data may be L2P map data including the logical address and the physical address of the foreground application.

The data storage device 13 may store data that is accessed by a host device (not illustrated) such as a cellular phone, a MP3 player, a laptop computer, a desktop computer, a game machine, a television, and an in-vehicle infotainment system. The data storage device 13 may also be referred to as a memory system.

The data storage device 13 may be fabricated as any of various types of storage devices according to an interface protocol electrically connected to the host device 11. For example, the data storage device 13 may be configured as any of various types of storage devices such as a multimedia card in the form of a solid state drive (SSD), an MMC, an eMMC, an RS-MMC, or a micro-MMC, a secure digital card in the form of an SD, a mini-SD, or a micro-SD, a universal serial bus (USB) storage device, a universal flash storage (UFS) device, a storage device in the form of a personal computer memory card international association (PCMCIA) card, a storage device in the form of a peripheral component interconnection (PCI) card, a storage device in the form of a PCI express (PCI-E) card, a compact flash (CF) card, a smart media card, and a memory stick.

The data storage device 13 may be fabricated as any of various types of packages. For example, the data storage device 13 may be fabricated as any of various types of packages such as a package on package (POP), a system in package (SIP), a system on chip (SOC), a multi-chip package (MCP), a chip on board (COB), a wafer-level fabricated package (WFP), and a wafer-level stack package (WSP).

The nonvolatile memory apparatus 100 may serve as a storage medium of the data storage device 13. The nonvolatile memory apparatus 100 may be configured as any of various types of nonvolatile memory apparatuses, such as a NAND flash memory, a NOR flash memory, a ferroelectric random access memory (FRAM) using a ferroelectric capacitor, a magnetic random access memory (MRAM) using a tunneling magneto-resistive (TMR) film, a phase change random access memory (PRAM) using chalcogenide alloys, and a resistive random access memory (ReRAM) using a transition metal oxide, according to memory cells.

Figure 2:
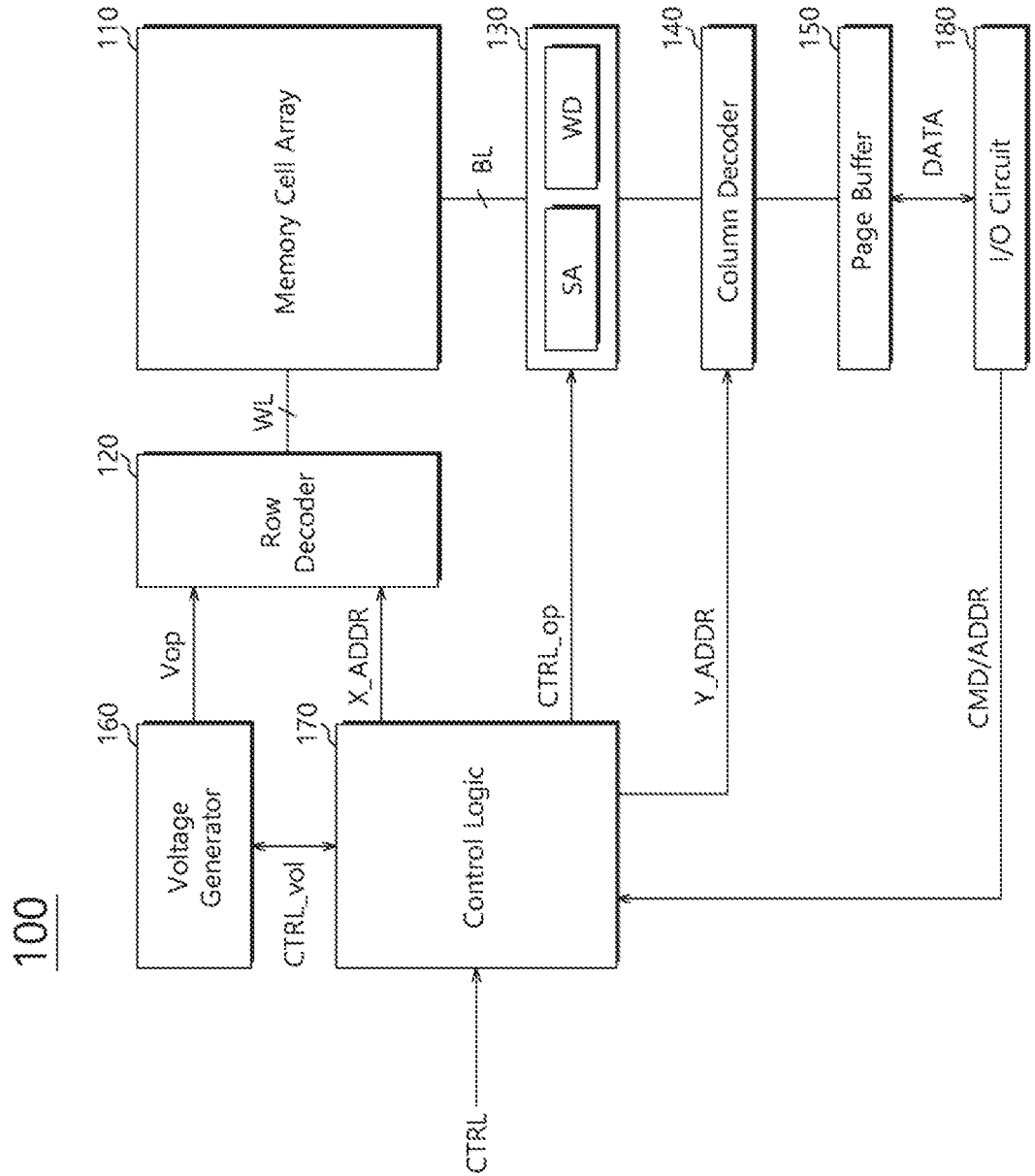
FIG. 2 is a detailed diagram of the nonvolatile memory apparatus shown in FIG. 1.
Figure 3:
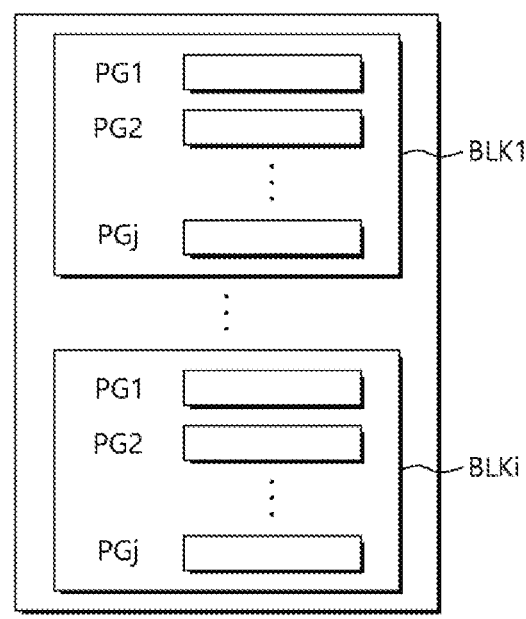
FIG. 3 is a detailed diagram of the memory cell array shown in FIG. 2.

FIG. 2 is a detailed diagram of the nonvolatile memory apparatus 100 shown in FIG. 1, and FIG. 3 is a detailed diagram of the memory cell array 110 shown FIG. 2.

Referring to FIG. 2, the nonvolatile memory apparatus 100 may include the memory cell array 110, a row decoder 120, a write/read circuit 130, a column decoder 140, a page buffer 150, a voltage generator 160, a control logic 170, and an input/output (I/O) circuit 180.

The memory cell array 110 may include a plurality of memory cells (not illustrated) arranged in intersection areas of a plurality of bit lines BL and a plurality of word lines WL, respectively. Referring to FIG. 3, the memory cell array 110 may include a plurality of memory blocks BLK1 to BLKi and the plurality of memory blocks BLK1 to BLKi may include a plurality of pages PG1 to PGj, respectively.

Each memory cell of the memory cell array 110 may be a single level cell (SLC) capable of storing one-bit data, a multi-level cell (MLC) capable of storing two-bit data, a triple level cell (TLC) capable of storing three-bit data, or a quadruple level cell (QLC) capable of storing four-bit data.

The memory cell array 110 may include at least one of the single level cells, the multi-level cells, the triple level cells, and the quadruple level cells. The memory cell array 110 may include memory cells arranged in a two-dimensional horizontal structure or memory cells arranged in a three-dimensional vertical structure.

The row decoder 120 may be electrically connected to the memory cell array 110 through the word lines WL. The row decoder 120 may operate under the control of the control logic 170. The row decoder 120 may decode a row address X_ADDR provided from the control logic 170, and select and drive at least one word line WL of the word lines WL based on the decoding result. The row decoder 120 may provide the selected word line WL with an operation voltage Vop provided from the voltage generator 160.

The write/read circuit 130 may be electrically connected to the memory cell array 110 through the bit lines BL. The write/read circuit 130 may include read/write circuits (not illustrated) corresponding to the bit lines BL, respectively. The write/read circuit 130 may operate under the control of the control logic 170. The write/read circuit 130 may include a write driver WD for writing data to the memory cells and a sense amplifier SA for amplifying data read from the memory cells. The write/read circuit 130 may provide a current or voltage pulse to memory cells selected by the row decoder 120 and the column decoder 140 among the memory cells of the memory cell array 110, thereby performing write and read operations on the selected memory cells.

The column decoder 140 may operate under the control of the control logic 170. The column decoder 140 may decode a column address Y_ADDR provided from the control logic 170. The column decoder 140 may electrically connect the read/write circuits of the write/read circuit 130, which correspond to the bit lines BL respectively, to the page buffer 150 based on the decoding result.

The page buffer 150 may be configured to temporarily store data, which is provided from the memory interface 240 of the controller 200 and is to be written to the memory cell array 110, or data, which is read from the memory cell array 110 and is to be provided to the memory interface 240 of the controller 200. The page buffer 150 may operate under the control of the control logic 170.

The voltage generator 160 may generate various voltages for performing write, read, and erase operations on the memory cell array 110 based on a voltage control signal CTRL_vol provided from the control logic 170. The voltage generator 160 may generate driving voltages Vop for driving the plurality of word lines WL and the plurality of bit lines BL. Furthermore, the voltage generator 160 may generate at least one reference voltage in order to read data stored in the memory cell MC.

The control logic 170 may output various control signals for writing data DATA to the memory cell array 110 or read the data DATA from the memory cell array 110 based on a command CMD, an address ADDR, and a control signal CTRL received from the controller 200. Various control signals outputted from the control logic 170 may be provided to the row decoder 120, the write/read circuit 130, the column decoder 140, the page buffer 150, and the voltage generator 160. Accordingly, the control logic 170 may generally control various operations performed in the nonvolatile memory apparatus 100.

Specifically, the control logic 170 may generate an operation control signal CTRL_op based on the command CMD and the control signal CTRL, and provide the generated operation control signal CTRL_op to the write/read circuit 130. The control logic 170 may provide the row address X_ADDR and the column address Y_ADDR included in the address ADDR to the row decoder 120 and the column decoder 140, respectively.

The I/O circuit 180 may be configured to receive the command CMD, the address ADDR, and the data DATA provided from the controller 200 or provide the controller 200 with the data DATA read from the memory cell array 110. The I/O circuit 180 may output the command CMD and the address ADDR received from the controller 200 to the control logic 170, and output the data DATA to the page buffer 150. The I/O circuit 180 may output the data DATA received from the page buffer 150 to the controller 200. The I/O circuit 180 may operate under the control of the control logic 170.

The controller 200 may control the overall operations of the data storage device 13 by executing firmware or software loaded into the memory 230. The controller 200 may decode and execute a code type instruction or an algorithm such as firmware or software. The controller 200 may be implemented in hardware or a combination of hardware and software.

The controller 200 may include the host interface 210, the processor 220, the memory 230, and the memory interface 240.

The host interface 210 may serve as an interface between the host device 11 and the data storage device 13 according to the protocol of the host device. For example, the host interface 210 may communicate with the host device through any of universal serial bus (USB), universal flash storage (UFS), multi-media card (MMC), parallel advanced technology attachment (PATA), serial advanced technology attachment (SATA), small computer system interface (SCSI), serial attached SCSI (SAS), peripheral component interconnection (PCI), and PCI express (PCI-E) protocols.

The processor 220 may be composed of a micro control unit (MCU) and a central processing unit (CPU). The processor 220 may process requests transmitted from the host device. In order to process the requests transmitted from the host device, the processor 220 may execute the code type instruction or algorithm loaded into the memory 230, that is, the firmware, and control internal function blocks, such as the host interface 210, the memory 230, and the memory interface 240, and the nonvolatile memory apparatus 100.

The processor 220 may generate control signals for controlling the operation of the nonvolatile memory apparatus 100 based on the requests transmitted from the host device, and provide the generated control signals to the nonvolatile memory apparatus 100 through the memory interface 240.

The memory 230 may be composed of a random access memory such as a dynamic random access memory (DRAM) or a static random access memory (SRAM). The memory 230 may store the firmware that is executed by the processor 220. Furthermore, the memory 230 may store data required for executing the firmware, for example, meta data. That is, the memory 230 may operate as a working memory of the processor 220.

The memory 230 may be configured to include a data buffer (DB) (not illustrated) for temporarily storing write data to be transmitted from the host device to the nonvolatile memory apparatus 100, or read data to be transmitted from the nonvolatile memory apparatus 100 to the host device. That is, the memory 230 may operate as a buffer memory.

The memory interface 240 may control the nonvolatile memory apparatus 100 under the control of the processor 220. The memory interface 240 may also be referred to as a memory controller. The memory interface 240 may provide the control signals to the nonvolatile memory apparatus 100. The control signals may include the command CMD, the address ADDR, the operation control signal CTRL and the like for controlling the nonvolatile memory apparatus 100. The memory interface 240 may provide the nonvolatile memory apparatus 100 with the data DATA, and may receive the data DATA from the nonvolatile memory apparatus 100.

Hereinafter, the following description will be given with reference to FIGS. 4 and 5 which describe an operation of generating an application-level ID in accordance with an embodiment, and FIGS. 6 and 7 which describe a method of outputting map data in accordance with an embodiment.

Figure 4:
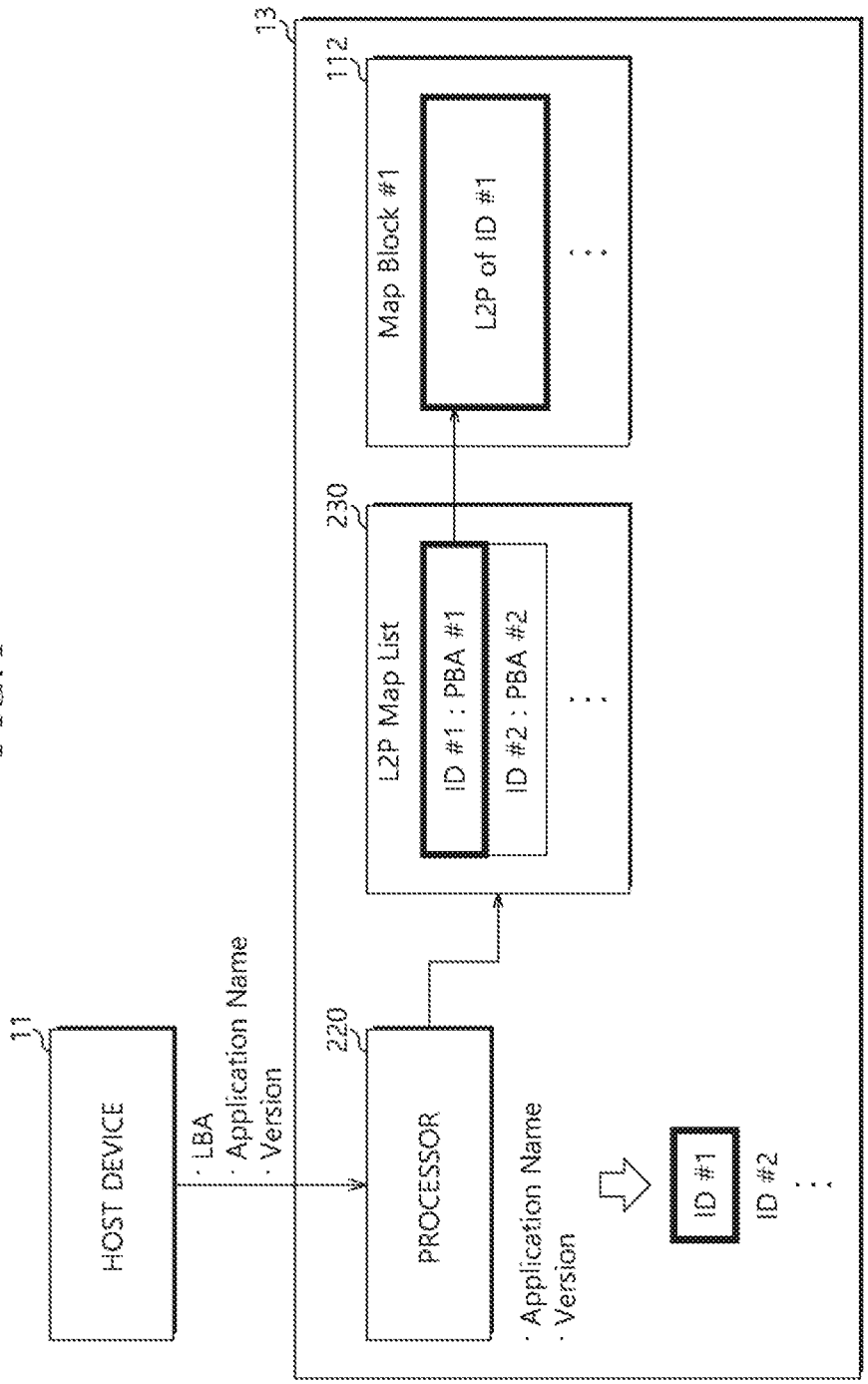
FIGS. 4 and 5 are diagrams describing an operation of generating an application-level ID in accordance with an embodiment.
Figure 5:
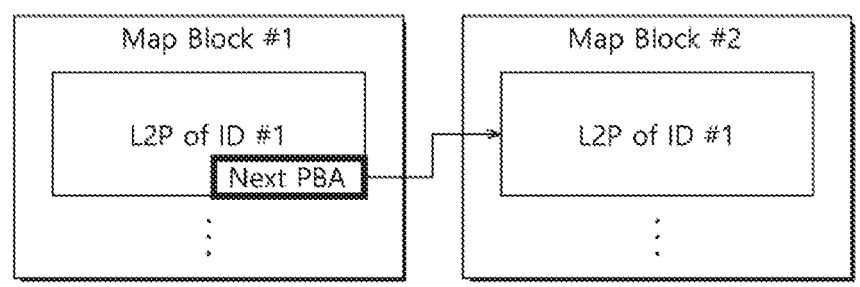

Referring to FIG. 4, when transmitting a read command, the host device 11 may transmit a name and a version of an application to the data storage device 13 in addition to a logical address.

The host device may transmit application information before receiving map data for the foreground application returned from the data storage device 13, thereby configuring a logical address area for each application. That is, the host device 11 may generate and manage in advance an L2P map list for the application information before the data storage device 13 provides the host device 11 with the map data for the foreground application.

The processor 220 of the data storage device 13 may generate IDs (ID #1, ID #2, ... ) by applying a hash function to the name and version of the application transmitted from the host device 11, and generate an L2P map list for each application based on the IDs. That is, in order to provide the map data for the foreground application to the host device 11, the processor 220 generates and manages the L2P map list in advance with respect to the name and version of the application transmitted from the host device 11.

Referring to FIG. 4, the L2P map list may include physical addresses that match by IDs, to which the hash function has been applied, such as ID #1: PBA #1, ID #2: PBA #2, .... The IDs, to which the hash function has been applied, may match map data for each ID (e.g., L2P of ID #1) of a map block (e.g., map block #1).

When the map data for each ID is stored across two or more map blocks, the map data for each ID may include a physical address link of a next map block.

Specifically, in some applications, since a relatively large number of LBAs are used, all maps may not be generated in a single physical block address (PBA). Referring to FIG. 5, it may be seen that map data L2P of ID #1 is very large and stored across a map block #1 and a map block #2. The processor 220 may store the PBA of the map block #2, which is a next map block, at the end of the map block #1 of ID #1.

The processor 220 may receive current foreground application information transmitted from the host device 11 for which map data is to be provided.

For reference, the host device 11 may determine a logical address, at which map data is provided from the data storage device 13, as a logical address currently used by the foreground application. This is because the host device 11 determines that an application running in the foreground performs a relatively large number of inputs/outputs (I/O).

Figure 6:
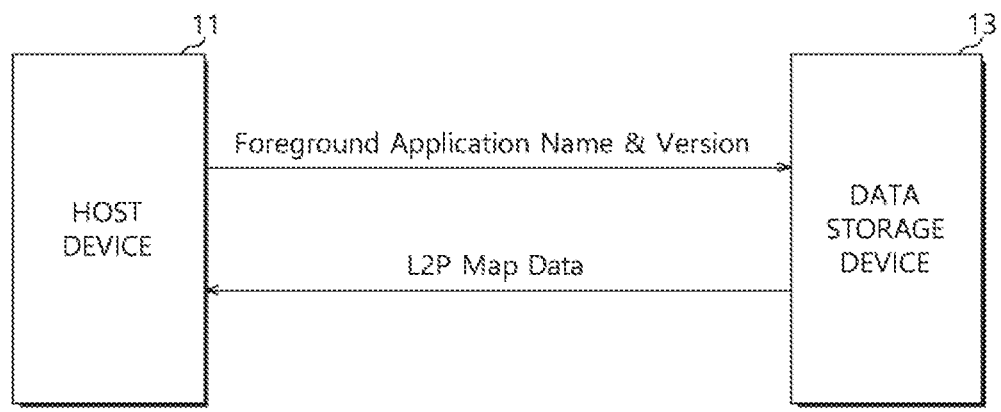
FIGS. 6 and 7 are diagrams describing a method of outputting map data in accordance with an embodiment.

Referring to FIG. 6, when the name and version of the foreground application are transmitted from the host device 11, the processor 220 of the data storage device 13 may search for and return corresponding map data based on the IDs. That is, the processor 220 transmits map data for the foreground application to the host device 11, and this allows the host device 11 to utilize the map data when transmitting a read command.

Referring to FIG. 7, when the name and version of the foreground application 'Foreground Application Name & Version' are received, the processor 220 may search for an ID (e.g., ID #1) that matches the name and version of the aforementioned foreground application, search for map data from the map block 112 based on the searched ID, and provide the searched map data to the host device 11. When the map data is stored across two or more map blocks, the processor 220 may search for map data stored in a next map block (e.g., Map Block #2) together, based on the physical address link (i.e., Next PBA) of the next map block. Of course, when the map data is stored only in one map block, the physical address link of the next map block is omitted.

The memory 230 may store the L2P map list for each application, which matches the IDs.

Referring to FIGS. 4 and 7, the memory 230 may match the L2P map list with the IDs to which the hash function has been applied, such as ID #1: PBA #1, ID #2: PBA #2, . . . , and store the L2P map list.

The memory interface 240 may control the nonvolatile memory apparatus 100 under the control of the processor 220.

The nonvolatile memory apparatus 100 may include the map block 112 that stores the map data for each ID.

Figure 8:
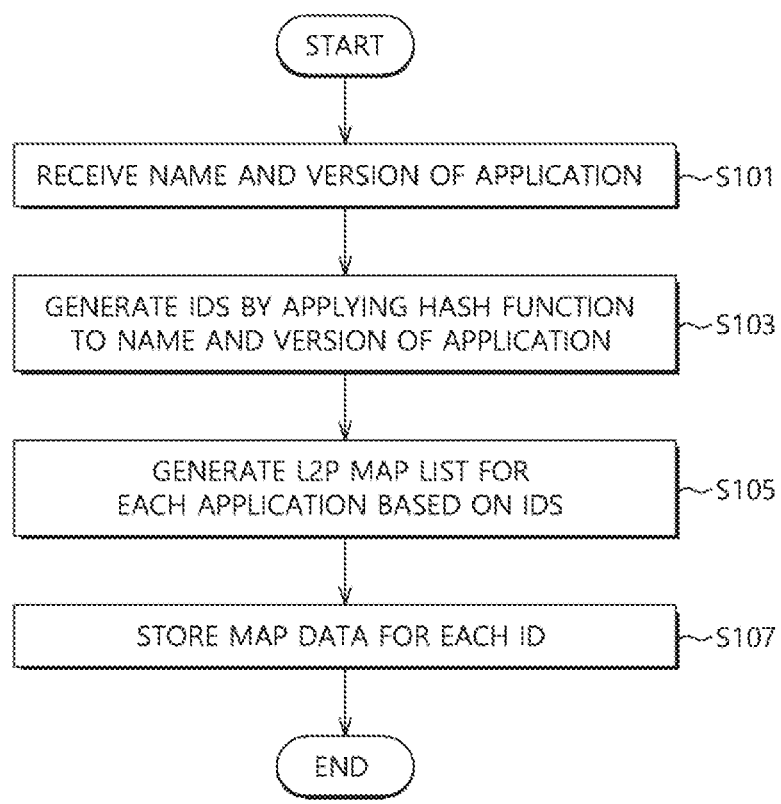
FIG. 8 is a flowchart describing an operating method of a data storage device in accordance with an embodiment.

FIG. 8 is a flowchart describing an operating method of the data storage device 13 in accordance with an embodiment.

First, the data storage device 13 may generate IDs based on application information transmitted from the host device 11.

Specifically, the data storage device 13 may receive the name and version of an application transmitted from the host device 11 when a read command is transmitted at step S101. Next, the data storage device 13 may generate the IDs by applying a hash function to the name and version of the application at step S103.

At step S105, the data storage device 13 may generate a map list for each application based on the IDs.

At step S107, the data storage device 13 may store the map data for each ID.

Referring back to FIG. 5, when the map data for each ID is stored across two or more map blocks, the data storage device 13 may allow the map data for each ID to include the physical address link of a next map block. The map data may be L2P map data including the logical address and the physical address of the foreground application.

The aforementioned steps S103, S105, and S107 may be pre-operations for returning map data for the foreground application which will be described below.

Figure 9:
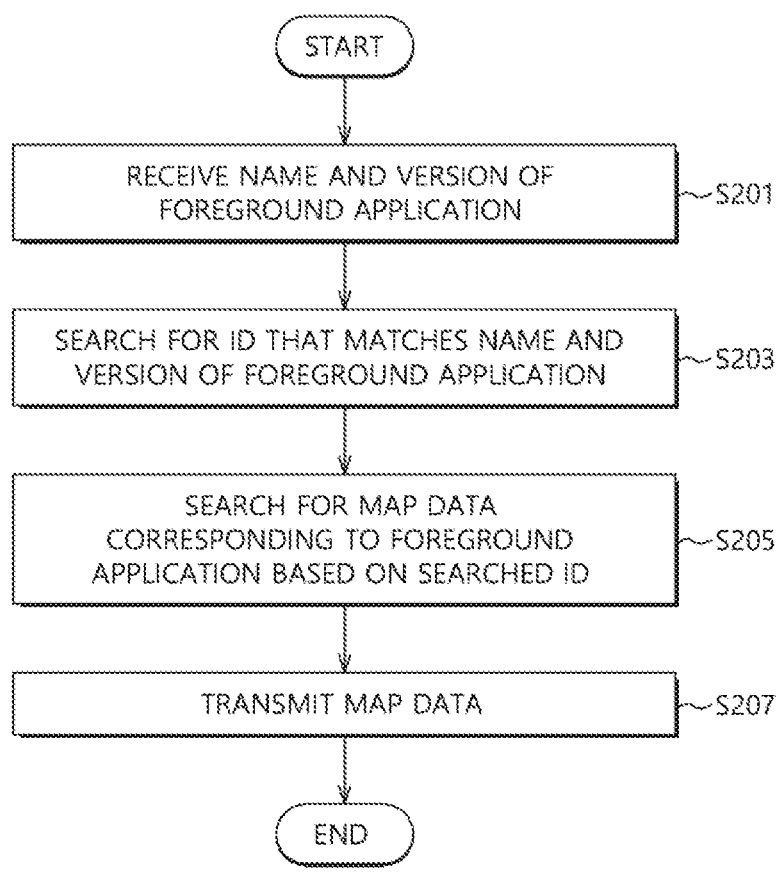
FIG. 9 is a flowchart describing in detail a technology of returning map data for a foreground application of FIG. 8.

FIG. 9 is a flowchart describing an operating method of the data storage device 13 in accordance with an embodiment. FIG. 9 illustrates an operation of returning the map data corresponding to the foreground application.

At step S201, the data storage device 13 may receive, from the host device 11, information on the foreground application, which is transmitted whenever the foreground application is changed. The information on the foreground application may include a name and a version of the foreground application.

At step S203, the data storage device 13 may search for an ID that matches the name and version of the foreground application.

At step S205, the data storage device 13 may search for map data corresponding to the foreground application based on the searched ID.

At step S207, the data storage device 13 may transmit the searched map data corresponding to the foreground application to the host device 11.

The host device 11 may store the map data corresponding to the foreground application transmitted from the data storage device 13, in the host memory 330. When map data (i.e., L2P information) corresponding to a logic address to access is stored in the host memory 330, the host device 11 may transmit the map data to the data storage device 13 along with a read command.

As illustrated in FIG. 7, the data storage device 13 may return map data (i.e., L2P map data for each ID) corresponding to the name and version of the foreground application to the host device 11.

Figure 10:
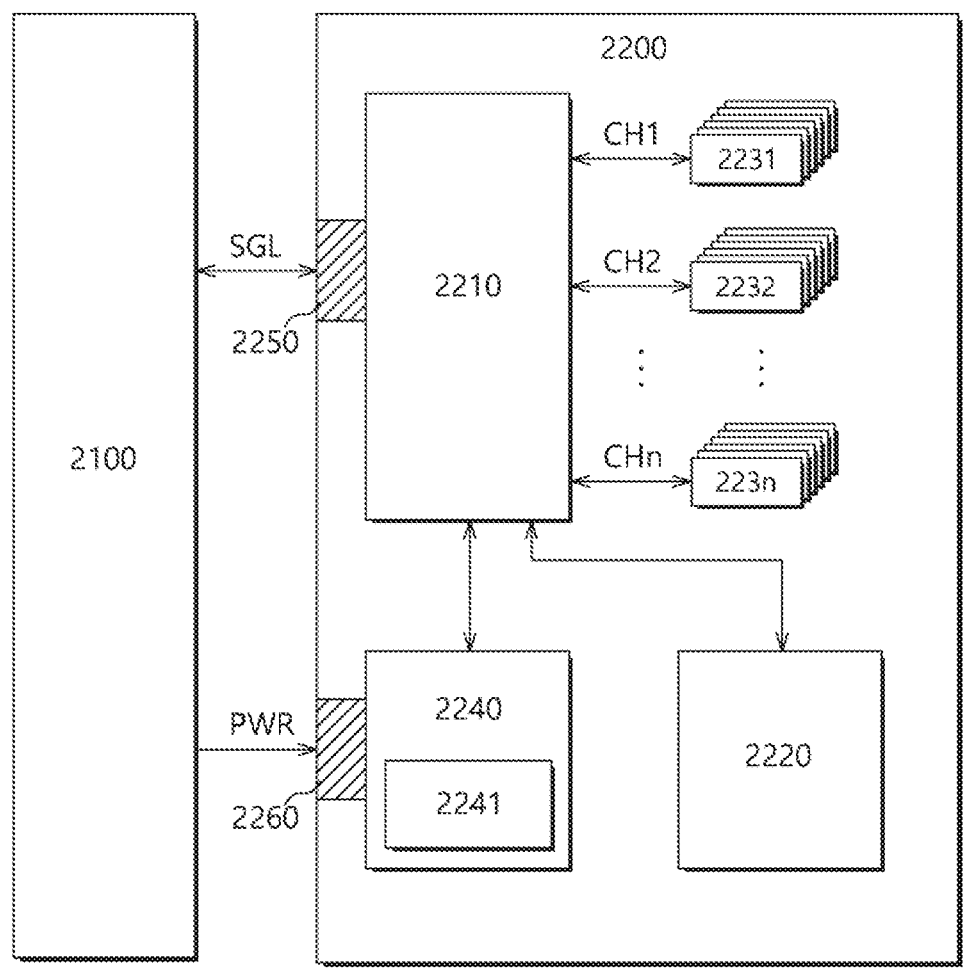
FIG. 10 is a diagram illustrating a data processing system including a solid state drive (SSD) in accordance with an embodiment.

FIG. 10 is a diagram illustrating a data processing system 2000 including a solid state drive (SSD) 2200 in accordance with an embodiment. Referring to FIG. 10, the data processing system 2000 may include a host device 2100 and the SSD 2200.

The SSD 2200 may include a controller 2210, a buffer memory 2220, nonvolatile memory apparatuses 2231 to 223n, a power supply 2240, a signal connector 2250, and a power connector 2260.

The controller 2210 may control the overall operation of the SSD 2200.

The buffer memory 2220 may temporarily store data to be stored in the nonvolatile memory apparatuses 2231 to 223n. Furthermore, the buffer memory 2220 may temporarily store data read from the nonvolatile memory apparatuses 2231 to 223n. The data temporarily stored in the buffer memory 2220 may be transmitted to the host device 2100 or the nonvolatile memory apparatuses 2231 to 223n under the control of the controller 2210.

The nonvolatile memory apparatuses 2231 to 223n may be used as storage media of the SSD 2200. The nonvolatile memory apparatuses 2231 to 223n may be electrically connected to the controller 2210 through a plurality of channels CH1 to CHn. One or more nonvolatile memory apparatuses may be electrically connected to one channel. The nonvolatile memory apparatuses electrically connected to one channel may be electrically connected to substantially the same signal bus and data bus.

The power supply 2240 may provide power PWR, which is inputted through the power connector 2260, to the inside of the SSD 2200. The power supply 2240 may include an auxiliary power supply 2241. The auxiliary power supply 2241 may supply power such that the SSD 2200 may be normally terminated when sudden power off occurs. The auxiliary power supply 2241 may include large capacity capacitors capable of charging the power PWR.

The controller 2210 may exchange a signal SGL with the host device 2100 through the signal connector 2250. The signal SGL may include a command, an address, data and the like. The signal connector 2250 may be configured with various types of connectors according to an interface method between the host device 2100 and the SSD 2200.

Figure 11:
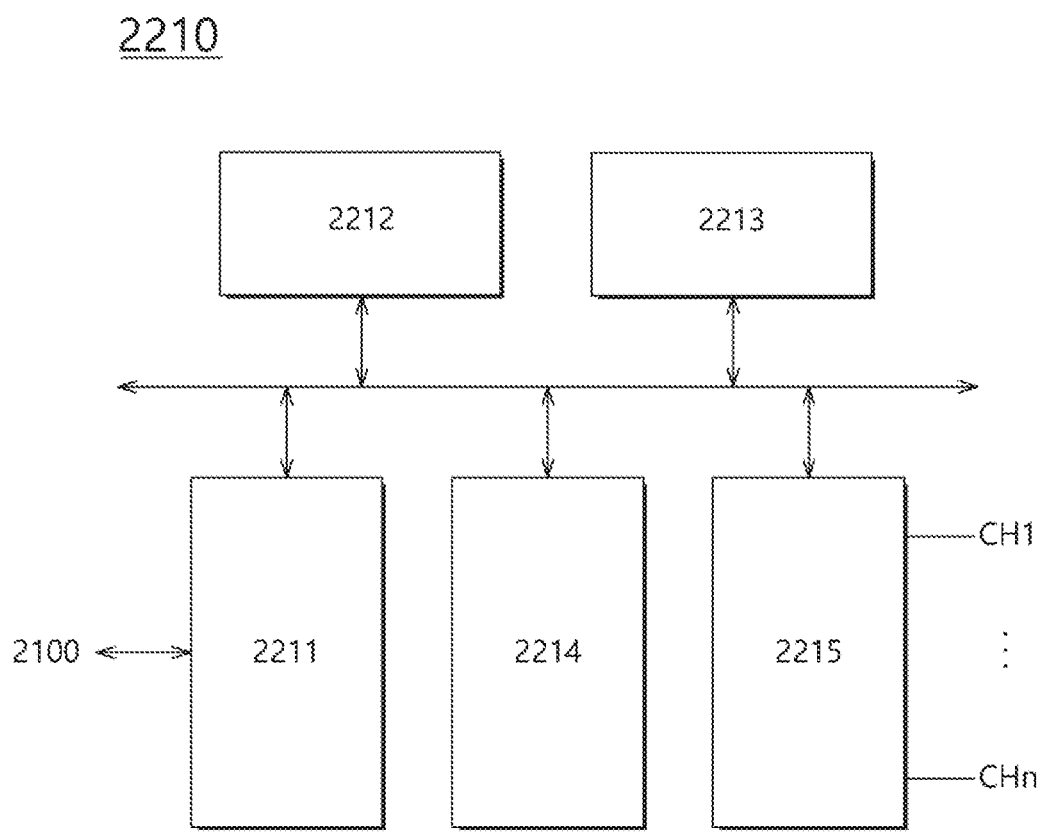
FIG. 11 is a detailed diagram of the controller shown in FIG. 10.

FIG. 11 is a detailed diagram of the controller 2210 shown in FIG. 10. Referring to FIG. 11, the controller 2210 may include a host interface (I/F) unit 2211, a control unit 2212, a random access memory (RAM) 2213, an error correction code (KC) unit 2214, and a memory interface (I/F) unit 2215.

The host interface unit 2211 may serve as an interface between the host device 2100 and the SSD 2200 according to a protocol of the host device 2100. For example, the host interface unit 2211 may communicate with the host device 2100 through any of a secure digital (SD), a universal serial bus (USB), a multi-media card (MMC), an embedded MMC (eMMC), a personal computer memory card international association (PCMCIA), a parallel advanced technology attachment (DATA), a serial advanced technology attachment (SATA), a small computer system interface (SCSI), a serial attached SCSI (SAS), a peripheral component interconnection (PCI), a PCI express (PCI-E), and a universal flash storage (UFS) protocols. Furthermore, the host interface unit 2211 may perform a disk emulation function of enabling the host device 2100 to recognize the SSD 2200 as a general data storage device, for example, a hard disk drive (HDD).

The control unit 2212 may analyze and process the signal SGL inputted from the host device 2100. The control unit 2212 may control operations of internal functional blocks according to firmware or software for driving the SSD 2200. The random access memory 2213 may be used as a working memory for executing such firmware or software.

The error correction code (KC) unit 2214 may generate parity data to be transmitted to the nonvolatile memory apparatuses 2231 to 223n. The generated parity data may be stored in the nonvolatile memory apparatuses 2231 to 223n together with data. The error correction code (KC) unit 2214 may detect an error of data read from the nonvolatile memory apparatuses 2231 to 223n based on the parity data. When the detected error is within a correctable range, the error correction code (ECC) unit 2214 may correct the detected error.

The memory interface unit 2215 may provide the nonvolatile memory apparatuses 2231 to 223n with a control signal such as a command and an address under the control of the control unit 2212. Furthermore, the memory interface unit 2215 may exchange data with the nonvolatile memory apparatuses 2231 to 223n under the control of the control unit 2212. For example, the memory interface unit 2215 may provide the nonvolatile memory apparatuses 2231 to 223n with the data stored in the buffer memory 2220, or provide the buffer memory 2220 with data read from the nonvolatile memory apparatuses 2231 to 223n.

Figure 12:
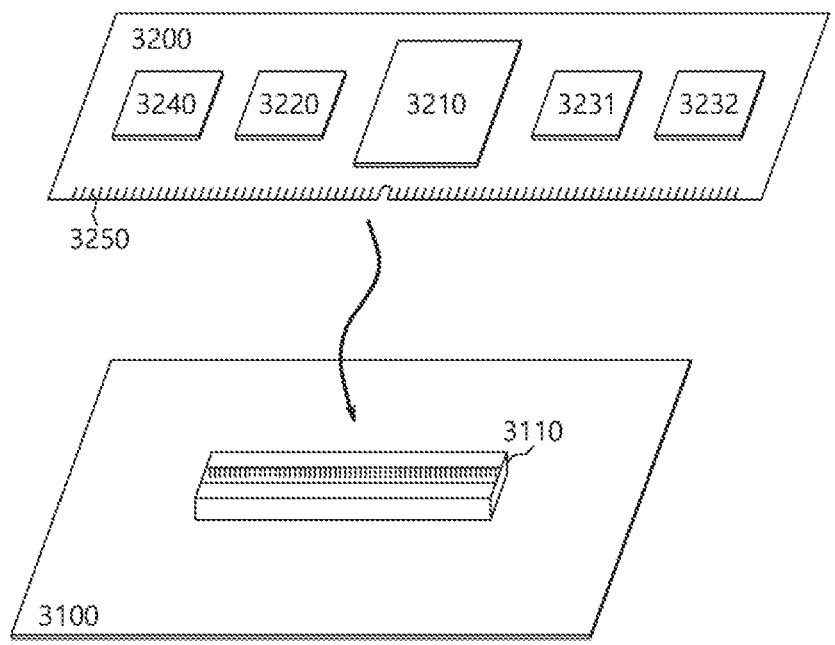
FIG. 12 is a diagram illustrating a data processing system including a data storage device in accordance with an embodiment.

FIG. 12 is a diagram illustrating a data processing system 3000 including a data storage device 3200 in accordance with an embodiment. Referring to FIG. 12, the data processing system 3000 may include a host device 3100 and the data storage device 3200.

The host device 3100 may be configured in the form of a board such as a printed circuit board (PCB). Although not illustrated in the drawing, the host device 3100 may include internal functional blocks for performing the function of the host device.

The host device 3100 may include a connection terminal 3110 such as a socket, a slot, or a connector. The data storage device 3200 may be mounted on the connection terminal 3110.

The data storage device 3200 may be configured in the form of a board such as a printed circuit board. The data storage device 3200 may be called a memory module or a memory card. The data storage device 3200 may include a controller 3210, a buffer memory 3220, nonvolatile memory apparatuses 3231 and 3232, a power management integrated circuit (PMIC) 3240, and a connection terminal 3250.

The controller 3210 may control the overall operation of the data storage device 3200. The controller 3210 may be configured in substantially the same manner as the controller 2210 illustrated in FIG. 11.

The buffer memory 3220 may temporarily store data to be stored in the nonvolatile memory apparatuses 3231 and 3232. Furthermore, the buffer memory 3220 may temporarily store data read from the nonvolatile memory apparatuses 3231 and 3232. The data temporarily stored in the buffer memory 3220 may be transmitted to the host device 3100 or the nonvolatile memory apparatuses 3231 and 3232 under the control of the controller 3210.

The nonvolatile memory apparatuses 3231 and 3232 may be used as storage media of the data storage device 3200.

The PMIC 3240 may provide power, which is inputted through the connection terminal 3250, to the inside of the data storage device 3200. The PMIC 3240 may manage the power of the data storage device 3200 under the control of the controller 3210.

The connection terminal 3250 may be electrically connected to the connection terminal 3110 of the host device 3100. A signal such as a command, an address, and data, and power may be transmitted between the host device 3100 and the data storage device 3200 through the connection terminal 3250. The connection terminal 3250 may be configured in various forms according to an interface method between the host device 3100 and the data storage device 3200. The connection terminal 3250 may be disposed on any side of the data storage device 3200.

Figure 13:
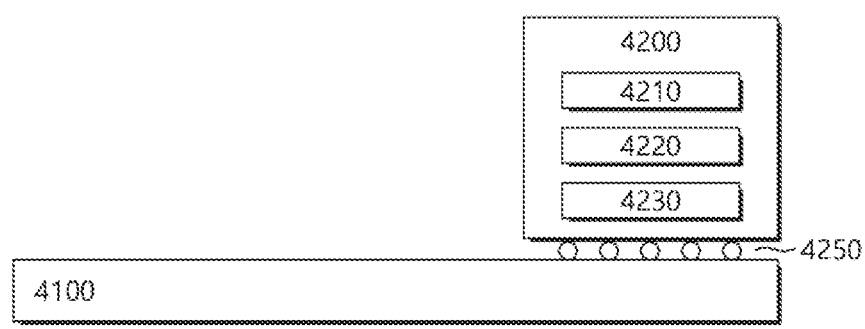
FIG. 13 is a diagram illustrating a data processing system including a data storage device in accordance with an embodiment.

FIG. 13 is a diagram illustrating a data processing system 4000 including a data storage device 4200 in accordance with an embodiment. Referring to FIG. 13, the data processing system 4000 may include a host device 4100 and the data storage device 4200.

The host device 4100 may be configured in the form of a board such as a printed circuit board (PCB). Although not illustrated in the drawing, the host device 4100 may include internal functional blocks for performing the function of the host device.

The data storage device 4200 may be configured in the form of a surface mount package. The data storage device 4200 may be mounted on the host device 4100 through a solder ball 4250. The data storage device 4200 may include a controller 4230, a buffer memory 4220, and a nonvolatile memory apparatus 4210.

The controller 4230 may control the overall operation of the data storage device 4200. The controller 4230 may be configured in substantially the same manner as the controller 2210 illustrated in FIG. 11.

The buffer memory 4220 may temporarily store data to be stored in the nonvolatile memory apparatus 4210. Furthermore, the buffer memory 4220 may temporarily store data read from the nonvolatile memory apparatus 4210. The data temporarily stored in the buffer memory 4220 may be transmitted to the host device 4100 or the nonvolatile memory apparatus 4210 under the control of the controller 4230.

The nonvolatile memory apparatus 4210 may serve as a storage medium of the data storage device 4200.

Figure 14:
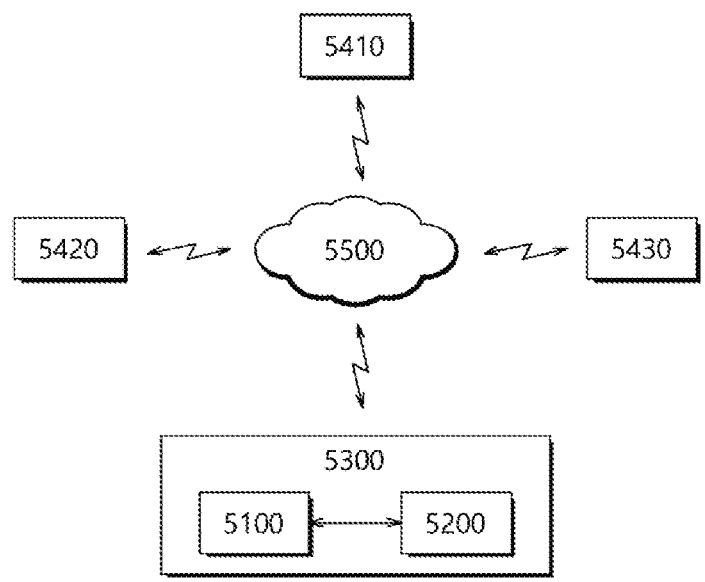
FIG. 14 is a diagram illustrating a network system including a data storage device in accordance with an embodiment.

FIG. 14 is a diagram illustrating a network system 5000 including a data storage device 5200 in accordance with an embodiment. Referring to FIG. 14, the network system 5000 may include a server system 5300 and a plurality of client systems 5410, 5420, and 5430, which are connected to each other through a network 5500.

The server system 5300 may service data in response to requests of the plurality of client systems 5410, 5420, and 5430. For example, the server system 5300 may store data provided from the plurality of client systems 5410, 5420, and 5430. In another example, the server system 5300 may provide data to the plurality of client systems 5410, 5420, and 5430.

The server system 5300 may include a host device 5100 and the data storage device 5200. The data storage device 5200 may be configured as the data storage device 13 of FIG. 1, the data storage device 2200 of FIG. 10, the data storage device 3200 of FIG. 12, and the data storage device 4200 of FIG. 13.

While various embodiments have been described above, it will be understood to those skilled in the art that the embodiments described are examples only. Accordingly, the data storage device, the data processing system, and the operating method of the data storage device described herein should not be limited based on the described embodiments.

What is claimed is:

1. A data processing system comprising:
   a host device configured to transmit a name and a version of an application to a data storage device together with a logical address; and
   the data storage device configured to generate an identification (ID) based on the name and version of the application transmitted from the host device, generate a logical address to physical address (L2P) map list for each application based on the ID, and store the L2P map list in a corresponding map block.

2. The data processing system according to claim 1, wherein the data storage device applies a hash function to the name and version of the application to generate the ID.

3. The data processing system according to claim 1, wherein, when a foreground application is changed, the host device transmits a name and a version of the foreground application to the data storage device, and
   the data storage device returns map data for the foreground application based on the L2P map list, to the host device.

4. The data processing system according to claim 3, wherein the data storage device comprises:
   a memory configured to store the L2P map list that matches the ID;
   a plurality of map blocks configured to store map data for each ID; and
   a processor electrically connected to the host device and configured to control an operation of the data storage device,
   wherein the processor generates and manages the ID by applying a hash function to the name and version of the application, and searches for and returns an ID that matches the name and version of the foreground application.

5. The data processing system according to claim 4, wherein, when the map data for each ID is stored across two or more map blocks, the map data for each ID includes a physical address link of a next map block.

6. The data processing system according to claim 3, wherein the map data for the foreground application is L2P map data including a logical address and a physical address of the foreground application.

7. The data processing system according to claim 3, wherein the host device stores the map data for the foreground application transmitted from the data storage device, in a host memory, and transmits, when map data corresponding to a logic address to access is stored in the host memory, the map data to the data storage device along with a read command.

8. The data processing system according to claim 1, wherein the host device transmits the name and version of the application, and the logical address to the data storage device when transmitting a read command to the data storage device.

9. A data storage device comprising:
   a controller configured to generate an ID based on a name and a version of an application transmitted from a host device together with a logic address, and generate an L2P map list for each application based on the ID; and
   a nonvolatile memory apparatus including a plurality of map blocks configured to store map data for each ID.

10. The data storage device according to claim 9, wherein the data storage device applies a hash function to the name and version of the application to generate the ID.

11. The data storage device according to claim 9, wherein, the controller, when a foreground application is changed, receives a name and a version of the foreground application from the host device, and searches for and returns corresponding map data based on the ID.

12. The data storage device according to claim 11, wherein the controller comprises:
   a memory configured to store the L2P map list that matches the ID; and
   a processor electrically connected to the host device and configured to control an operation of the data storage device,
   wherein the processor generates and manages the ID by applying a hash function to the name and version of the application, and searches for and returns an ID that matches the name and version of the foreground application.

13. The data storage device according to claim 11, wherein, when the map data for each ID is stored across two or more map blocks, the map data for each ID includes a physical address link of a next map block.

14. The data storage device according to claim 11, wherein the returned map data is L2P map data including a logical address and a physical address of the foreground application.

15. An operating method of a data storage device, comprising:
   generating an ID based on application information transmitted from a host device;
   generating an L2P map list for each application based on the ID; and
   storing map data for each ID.

16. The operating method according to claim 15, wherein the generating the ID comprises:
   receiving a name and a version of the application from the host device; and
   generating the ID by applying a hash function to the name and version of the application.

17. The operating method according to claim 15, wherein, in the storing of the map data for each ID, when the map data for each ID is stored across at least two or more blocks, the map data for each ID includes a physical address link of a next map block.

18. The operating method according to claim 17, wherein receiving the information on the foreground application from the host device indicates that a name and a version of the foreground application are received from the host device, and
   wherein the step of searching for and returning the map data comprises:
   a step of searching for an ID that matches the name and the version of the foreground application; and
   a step of searching for and returning map data corresponding to the name and the version of the application based on the searched ID.

19. The operating method according to claim 15, further comprising:
  searching for, when information on a foreground application is received from the host device, an ID that matches the information on the foreground application; and
  returning map data corresponding to the information of the foreground application based on the searched ID.

20. The operating method according to claim 19, wherein the returned map data is L2P map data including a logical address and a physical address of the foreground application.

\* \* \* \* \*